US012794374B2

(12) United States Patent
Meng et al.

(10) Patent No.: US 12,794,374 B2
(45) Date of Patent: Nov. 10, 2026

(54) POWER CONVERSION APPARATUS AND SYNCHRONOUS RECTIFICATION CIRCUIT THEREOF

(71) Applicant: Power Forest Technology Corporation, Hsinchu County (TW)

(72) Inventors: Che-Hao Meng, Hsinchu County (TW); Chien Lung Li, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 177 days.

(21) Appl. No.: 18/957,908

(22) Filed: Nov. 25, 2024

(65) Prior Publication Data

US 2026/0095105 A1 Apr. 2, 2026

(30) Foreign Application Priority Data

Oct. 1, 2024 (TW) ................................ 113210719

(51) Int. Cl.
*H02M 3/335* (2006.01)
*H02M 1/00* (2006.01)

(52) U.S. Cl.
CPC ..... *H02M 3/33592* (2013.01); *H02M 1/0035* (2021.05)

(58) Field of Classification Search
CPC ............. H02M 1/0032; H02M 1/0035; H02M 3/33592
See application file for complete search history.

(56) References Cited

U.S. PATENT DOCUMENTS 8,526,202 B2 * 9/2013 Fang ........................ H03K 5/08 363/127
10,560,012 B1 * 2/2020 Yang ................. H02M 3/33523
11,489,451 B1 * 11/2022 Liu ................... H02M 3/33592
2004/0125621 A1 * 7/2004 Yang ................. H02M 3/33592 363/21.14
2015/0103567 A1 * 4/2015 Wang ................ H02M 3/33592 363/21.13
2020/0036293 A1 * 1/2020 Kannan ............. H02M 3/33523
2020/0403519 A1 * 12/2020 Moon ................... H02M 1/088

* cited by examiner

*Primary Examiner* — Gary L Laxton
(74) *Attorney, Agent, or Firm* — JCIPRNET

(57) ABSTRACT

A power conversion apparatus and a synchronous rectification circuit thereof are provided. A control circuit determines whether the power conversion apparatus enters a burst mode based on a time when a drain voltage of a synchronous rectification transistor is lower than a preset voltage, and adjusts a pulse width of a pulse signal generated by a pulse signal generating circuit.

12 Claims, 3 Drawing Sheets

POWER CONVERSION APPARATUS AND SYNCHRONOUS RECTIFICATION CIRCUIT THEREOF

CROSS-REFERENCE TO RELATED APPLICATION

This application claims the priority benefit of Taiwan application serial no. 113210719, filed on Oct. 1, 2024. The entirety of the above-mentioned patent application is hereby incorporated by reference herein and made a part of this specification.

BACKGROUND

Technical Field

The invention relates to an electronic apparatus, and particularly relates to a power conversion apparatus and a synchronous rectification circuit thereof.

Description of Related Art

Power conversion apparatuses are indispensable components in modern electronic devices. In a power conversion apparatus based on pulse width modulation (PWM) control, a secondary side of the power conversion apparatus usually has a rectifier diode. Since power consumption of the rectifier diode is relatively large in a turn-on state, a synchronous rectification transistor with a lower turn-on resistance may be used to replace the rectifier diode. Under such a framework, a synchronous rectification controller is still needed to control turning-on/off of the synchronous rectification transistor on the secondary side.

In a burst mode, the power conversion apparatus may reduce a number of switching times of the synchronous rectification transistor to improve the efficiency of the power conversion apparatus. However, in the burst mode, a transition time required for a drain voltage of the synchronous rectification transistor to change from a high voltage level to a low voltage level may become longer. The longer transition time may cause an abnormal conduction state of the synchronous rectification transistor, which may affect the efficiency of power conversion apparatus.

SUMMARY

The invention is directed to a power conversion apparatus and a synchronous rectification circuit thereof, which are adapted to automatically determine whether to enter a burst mode and avoid abnormal conduction state of the synchronous rectification transistor.

The invention provides a synchronous rectification circuit suitable for driving a synchronous rectification transistor of a power conversion apparatus. The synchronous rectification circuit includes a control circuit, a pulse signal generating circuit, a first comparison circuit, a logic gate circuit, and a logic control circuit. The control circuit is coupled to a drain terminal of the synchronous rectification transistor to receive a drain voltage. The pulse signal generating circuit is coupled to the control circuit. The control circuit determines whether the power conversion apparatus enters a burst mode according to a time when the drain voltage is lower than a preset voltage, and adjusts a pulse width of a pulse signal generated by the pulse signal generating circuit. The first comparison circuit is coupled to the drain terminal of the synchronous rectification transistor, and compares the drain voltage with a first reference voltage to output a first comparison signal. The logic gate circuit is coupled to the pulse signal generating circuit and the first comparison circuit, and generates a conduction control signal according to the pulse signal and the first comparison signal. The logic control circuit is coupled to the logic gate circuit and a control terminal of the synchronous rectification transistor, and turns on the synchronous rectification transistor according to the conduction control signal.

In an embodiment of the invention, the synchronous rectification circuit further includes a second comparison circuit, which is coupled to the drain terminal of the synchronous rectification transistor, and compares the drain voltage with a second reference voltage to output a second comparison signal, and the logic control circuit turns off the synchronous rectification transistor according to the second comparison signal.

In an embodiment of the invention, the control circuit includes a third comparison circuit and an adjustment circuit. The third comparison circuit is coupled to the drain terminal of the synchronous rectification transistor, and compares the drain voltage with the preset voltage to output a third comparison signal. The pulse signal generating circuit generates the pulse signal according to the third comparison signal. The adjustment circuit is coupled to the third comparison circuit and the pulse signal generating circuit, and adjusts the pulse width of the pulse signal according to the time when the drain voltage is lower than the preset voltage.

In an embodiment of the invention, the adjustment circuit determines that the power conversion apparatus enters the burst mode and adjusts the pulse width of the pulse signal in response to the time when drain voltage is lower than the preset voltage being greater than a preset time.

In an embodiment of the invention, the adjustment circuit further determines whether the power conversion apparatus enters the burst mode based on a switching frequency of the third comparison signal between a high voltage level and a low voltage level.

In an embodiment of the invention, the preset voltage is greater than the second reference voltage, and the second reference voltage is greater than the first reference voltage.

The invention further provides a power conversion apparatus including a transformer, a synchronous rectification transistor, and a synchronous rectification control circuit. The transformer has a primary side and a secondary side, where a first terminal of the primary side is configured to receive an input voltage, and a first terminal of the secondary side is configured to provide an output voltage to a load. A drain terminal of the synchronous rectification transistor is coupled to a second terminal of the secondary side, and a source terminal of the synchronous rectification transistor is coupled to a ground terminal. The synchronous rectification control circuit includes a control circuit, a pulse signal generating circuit, a first comparison circuit, a logic gate circuit, and a logic control circuit. The control circuit is coupled to the drain terminal of the synchronous rectification transistor to receive a drain voltage. The pulse signal generating circuit is coupled to the control circuit. The control circuit determines whether the power conversion apparatus enters a burst mode according to a time when the drain voltage is lower than a preset voltage, and adjusts a pulse width of a pulse signal generated by the pulse signal generating circuit. The first comparison circuit is coupled to the drain terminal of the synchronous rectification transistor, and compares the drain voltage with a first reference voltage to output a first comparison signal. The logic gate circuit is coupled to the pulse signal generating circuit and the first comparison circuit, and generates a conduction control signal according to the pulse signal and the first comparison signal. The logic control circuit is coupled to the logic gate circuit and a control terminal of the synchronous rectification transistor, and turns on the synchronous rectification transistor according to the conduction control signal.

In an embodiment of the invention, the synchronous rectification control circuit further includes a second comparison circuit, which is coupled to the drain terminal of the synchronous rectification transistor, and compares the drain voltage with a second reference voltage to output a second comparison signal, and the logic control circuit turns off the synchronous rectification transistor according to the second comparison signal.

In an embodiment of the invention, the control circuit includes a third comparison circuit and an adjustment circuit. The third comparison circuit is coupled to the drain terminal of the synchronous rectification transistor, and compares the drain voltage with the preset voltage to output a third comparison signal. The pulse signal generating circuit generates the pulse signal according to the third comparison signal. The adjustment circuit is coupled to the third comparison circuit and the pulse signal generating circuit, and adjusts the pulse width of the pulse signal according to the time when the drain voltage is lower than the preset voltage.

In an embodiment of the invention, the adjustment circuit determines that the power conversion apparatus enters the burst mode and adjusts the pulse width of the pulse signal in response to the time when the drain voltage is lower than the preset voltage being greater than a preset time.

In an embodiment of the invention, the adjustment circuit further determines whether the power conversion apparatus enters the burst mode based on a switching frequency of the third comparison signal between a high voltage level and a low voltage level.

In an embodiment of the invention, the preset voltage is greater than the second reference voltage, and the second reference voltage is greater than the first reference voltage.

Based on the above description, the control circuit of the embodiment of the invention is adapted to automatically determine whether the power conversion apparatus enters the burst mode based on the time when the drain voltage of the synchronous rectification transistor is lower than the preset voltage, and adjust the pulse width of the pulse signal generated by the pulse signal generating circuit, so as to avoid the abnormal conduction state of the synchronous rectification transistor.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
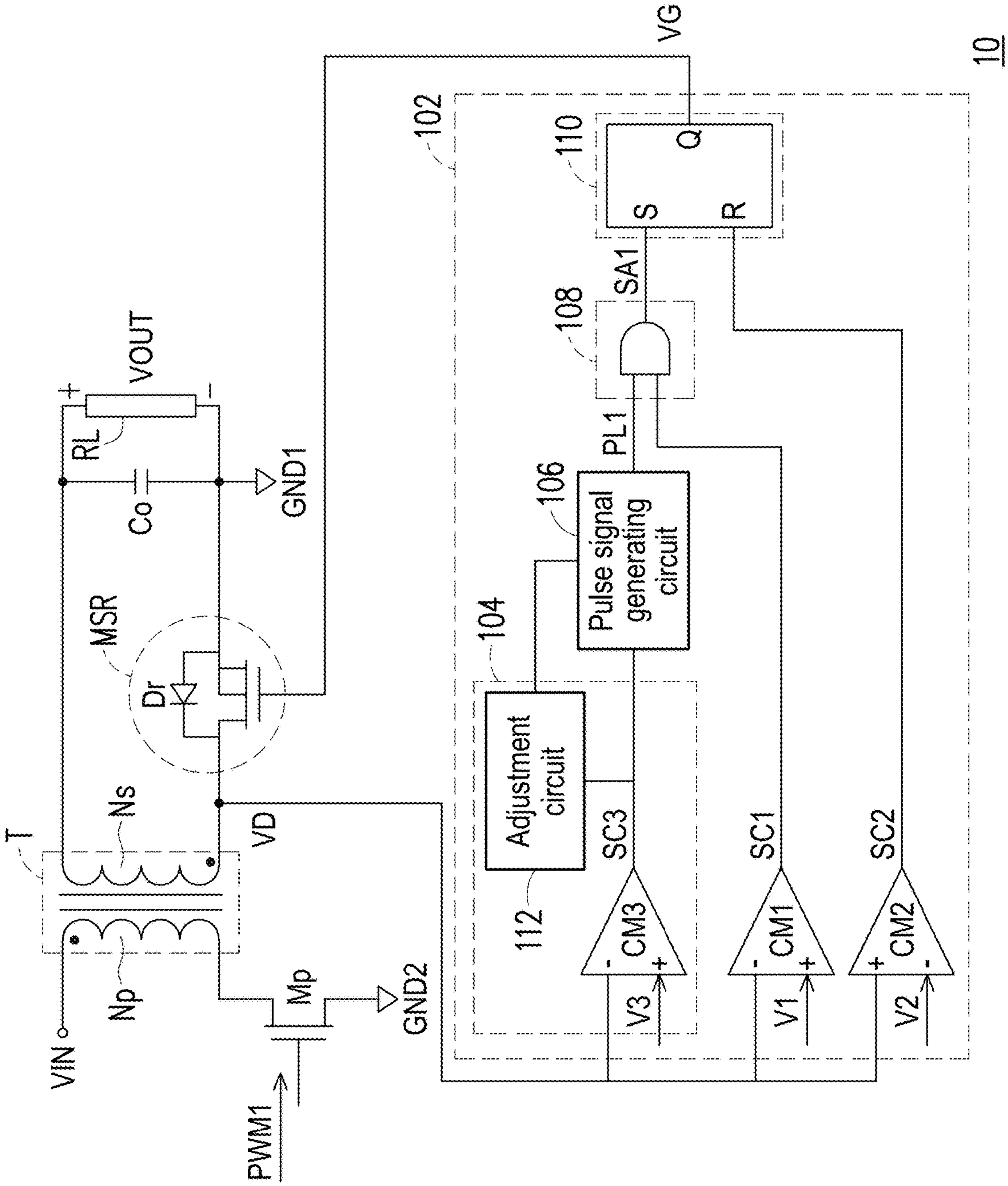
FIG. 1 is a schematic circuit block diagram of a power conversion apparatus according to an embodiment of the invention.

FIG. 1 is a schematic circuit block diagram of a power conversion apparatus according to an embodiment of the invention. In the embodiment, the power conversion apparatus 10 is a flyback structure, but the invention is not limited thereto. In other embodiments, the structure of the power conversion apparatus may also be a push-pull, forward, half-bridge, full-bridge or other types of structures, the operation of the power conversion apparatus when using other structures may be deduced by analogy according to the operation of the embodiment.

The power conversion apparatus 10 includes a transformer T, a synchronous rectification transistor MSR, a synchronous rectification control circuit 102, and a power switch Mp, but the invention is not limited thereto. The transformer T includes a primary side Np and a secondary side Ns. Where, a first terminal (such as a common-polarity terminal, i.e., a dotted terminal) of the primary side Np is configured to receive an input voltage VIN, and a first terminal (such as an opposite-polarity terminal, i.e., an undotted terminal) of the secondary side Ns is configured to provide an output voltage VOUT to a load RL (such as an electronic device) and charge a capacitor Co, but the invention is not limited thereto. A first terminal of the power switch Mp is coupled to a second terminal (such as an opposite-polarity terminal) of the primary side Np, a second terminal of the power switch Mp is coupled to a second ground terminal GND2, and the power switch Mp receives a pulse width modulation signal PWM1 from a control terminal thereof to change a conduction state.

A drain terminal of the synchronous rectification transistor MSR is coupled to a second terminal (for example, a common-polarity terminal) of the secondary side Ns, and a source terminal and a body terminal of the synchronous rectification transistor MSR are coupled to a first ground terminal GND1, where there is a parasitic diode Dr between the drain terminal and the body terminal of the synchronous rectification transistor MSR. In an embodiment of the invention, the synchronous rectification transistor MSR may be an N-type metal oxide semiconductor field effect transistor, but the invention is not limited thereto, which depends on an actual application or design requirements. The synchronous rectification control circuit 102 is coupled to the drain terminal of the synchronous rectification transistor MSR to receive a drain voltage VD. The synchronous rectification control circuit 102 may generate a synchronous rectification control signal VG to the control terminal of the synchronous rectification transistor MSR according to the drain voltage VD, so as to control a conduction state of the synchronous rectification transistor MSR.

The synchronous rectification control circuit 102 includes a control circuit 104, a pulse signal generating circuit 106, a logic gate circuit 108, a logic control circuit 110 and comparison circuits CM1 and CM3, where the control circuit 104 is coupled to the drain terminal of the synchronous rectification transistor MSR and the pulse signal generating circuit 106, and the pulse signal generating circuit 106 is further coupled to the logic gate circuit 108. Positive and negative input terminals of the comparison circuit CM1 are respectively coupled to a reference voltage V1 and the drain terminal of the synchronous rectification transistor MSR. An output terminal of the comparison circuit CM1 is coupled to the logic gate circuit 108. Positive and negative input terminals of the comparison circuit CM2 are respectively coupled to the drain terminal of the synchronous rectification transistor MSR and a reference voltage V2. The logic control circuit 110 is coupled to an output terminal of the logic gate circuit 108, an output terminal of the comparison circuit CM2, and the control terminal of the synchronous rectification transistor MSR.

The comparison circuit CM1 may compare the reference voltage V1 and the drain voltage VD to generate a comparison signal SC1. The comparison circuit CM2 may compare the drain voltage VD with the reference voltage V2 to generate a comparison signal SC2. The control circuit 104 may determine whether the power conversion apparatus 10 enters the burst mode based on a time when the drain voltage VD is lower than a preset voltage V3, and adjust a pulse width of the pulse signal PL1 generated by the pulse signal generating circuit 106, where the preset voltage V3 is greater than the reference Voltage V2, and the reference voltage V2 is greater than reference voltage V1.

The logic gate circuit 108 may generate a conduction control signal SA1 according to the pulse signal PL1 and the comparison signal SC1. The logic control circuit 110 may output a synchronous rectification control signal VG according to the conduction control signal SA1 and the comparison signal SC2 to turn on or turn off the synchronous rectification transistor MSR. In this way, it is determined whether the power conversion apparatus 10 enters the burst mode based on the time when the drain voltage of the synchronous rectification transistor MSR is lower than the preset voltage V3, and the pulse width of the pulse signal PL1 generated by the pulse signal generating circuit 106 is adjusted, which may effectively avoid the abnormal conduction state of the synchronous rectification transistor MSR.

Further, the control circuit 104 may include the comparison circuit CM3 and an adjustment circuit 112 as shown in FIG. 1, where positive and negative input terminals of the comparison circuit CM3 are respectively coupled to the preset voltage V3 and the drain terminal of the synchronous rectification transistor MSR, and an output terminal of the comparison circuit CM3 is coupled to the pulse signal generating circuit 106. The adjustment circuit 112 is coupled to the output terminal of the comparison circuit CM3 and the pulse signal generating circuit 106. In addition, the logic gate circuit 108 may include, for example, an AND gate, where two input terminals of the AND gate are coupled to the pulse signal generating circuit 106 and the output terminal of the comparison circuit CM1, and an output terminal of the AND gate is coupled to the logic control circuit 110. The logic control circuit 110 may be implemented, for example, as an SR flip-flop, where a setting terminal S and a reset terminal R of the SR flip-flop are respectively coupled to the output terminal of the logic gate circuit 108 and the output terminal of the comparison circuit CM2, and an output terminal Q of the SR flip-flop is coupled to the control terminal of the synchronous rectification transistor MSR.

The adjustment circuit 112 may determine the time when the drain voltage VD is lower than the preset voltage V3 according to the comparison signal SC3. When the comparison signal SC3 is at a high voltage level, it means that the drain voltage VD is lower than the preset voltage V3. The adjustment circuit 112 may determine to enter the burst mode, for example, when the comparison signal SC3 is at a high voltage level for a preset time. In other embodiments, the adjustment circuit 112 may also, for example, determine whether the power conversion apparatus 10 enters the burst mode based on a switching frequency of the comparison signal SC3 between a high voltage level and a low voltage level. For example, it is determined whether the power conversion apparatus 10 enters the burst mode according to whether a frequency of switching the comparison signal SC3 from a low voltage level to a high voltage level is lower than a preset frequency, or whether a frequency of switching the comparison signal SC3 from the high voltage level to the low voltage level is lower than the preset frequency, where when the switching frequency is lower than the preset frequency, it may be determined that the power conversion apparatus 10 enters the burst mode.

Figure 2:
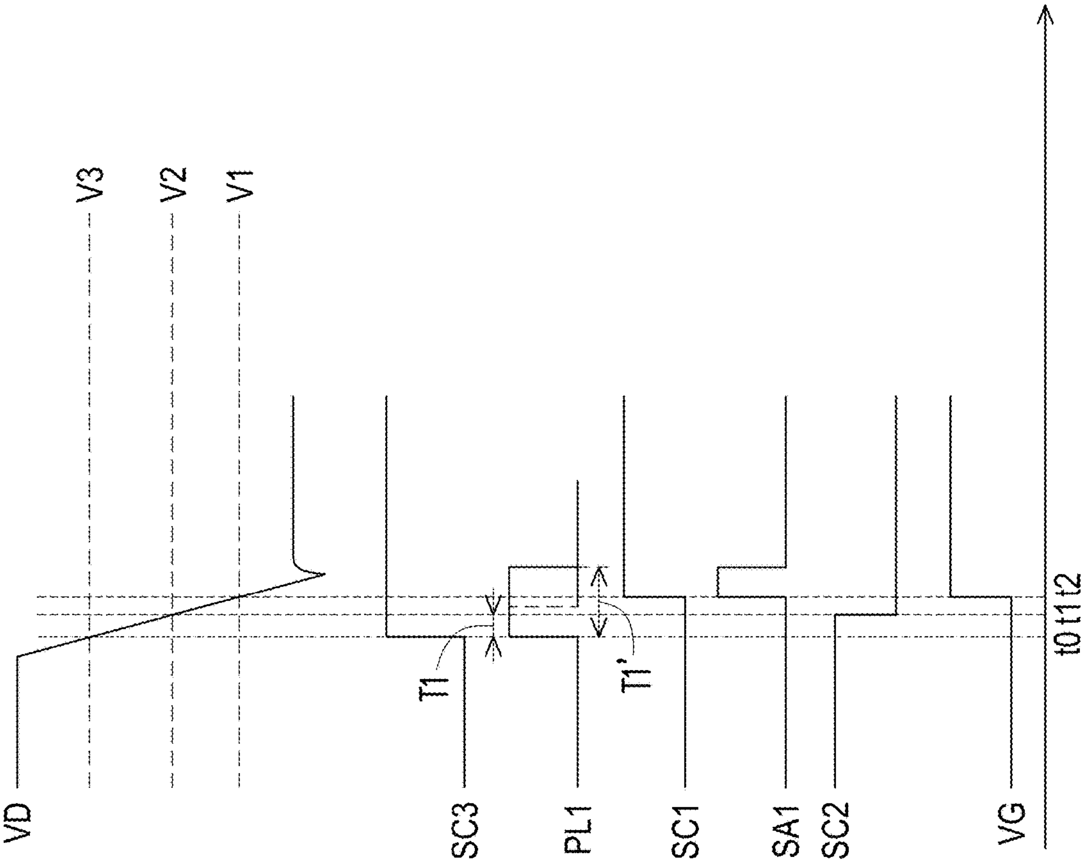
FIG. 2 and FIG. 3 are operation timing diagrams of the power conversion apparatus according to embodiments of the invention.

The method that the synchronous rectification control circuit 102 adjusts the pulse width of the pulse signal PL1 generated by the pulse signal generating circuit 106 in the burst mode is as shown in FIG. 2, and when the time required for the drain voltage VD to change from a high voltage level to a low voltage level becomes longer, the comparison signals SC3 and SC1 output by the comparison circuits CM3 and CM1 are sequentially changed from a low voltage level to a high voltage level at time points t0 and t2, and the comparison signal SC2 output by the comparison circuit CM2 is changed from a high voltage level to a low voltage level at a time point t1. As shown in FIG. 2, the adjustment circuit 112 may increase the pulse width of the pulse signal PL1 from Tl to Tl' to ensure that the period during which the pulse signal PL1 is at a high voltage level may overlap with the period during which the comparison signal SC1 is at the high voltage level, and output the conduction control signal SA1 with the high voltage level. This may avoid misalignment of the period during which the pulse signal PL1 is at a high voltage level and the period during which the comparison signal SC1 is at the high voltage level due to the longer time required for the drain voltage VD to change from the high voltage level to the low voltage level, which may result in a fact that the logic control circuit 110 cannot turn on the synchronous rectification transistor MSR according to the conduction control signal SA1, thereby increasing the power consumption of the synchronous rectification transistor MSR and reducing the overall efficiency of the power conversion apparatus.

It should be noted that, depending on actual application requirements, the adjustment circuit 112 is not limited to increasing the pulse width of the pulse signal PL1. In other embodiments, the adjustment circuit 112 may also reduce the pulse width of the pulse signal PL1, which is not limited by the invention.

Figure 3:
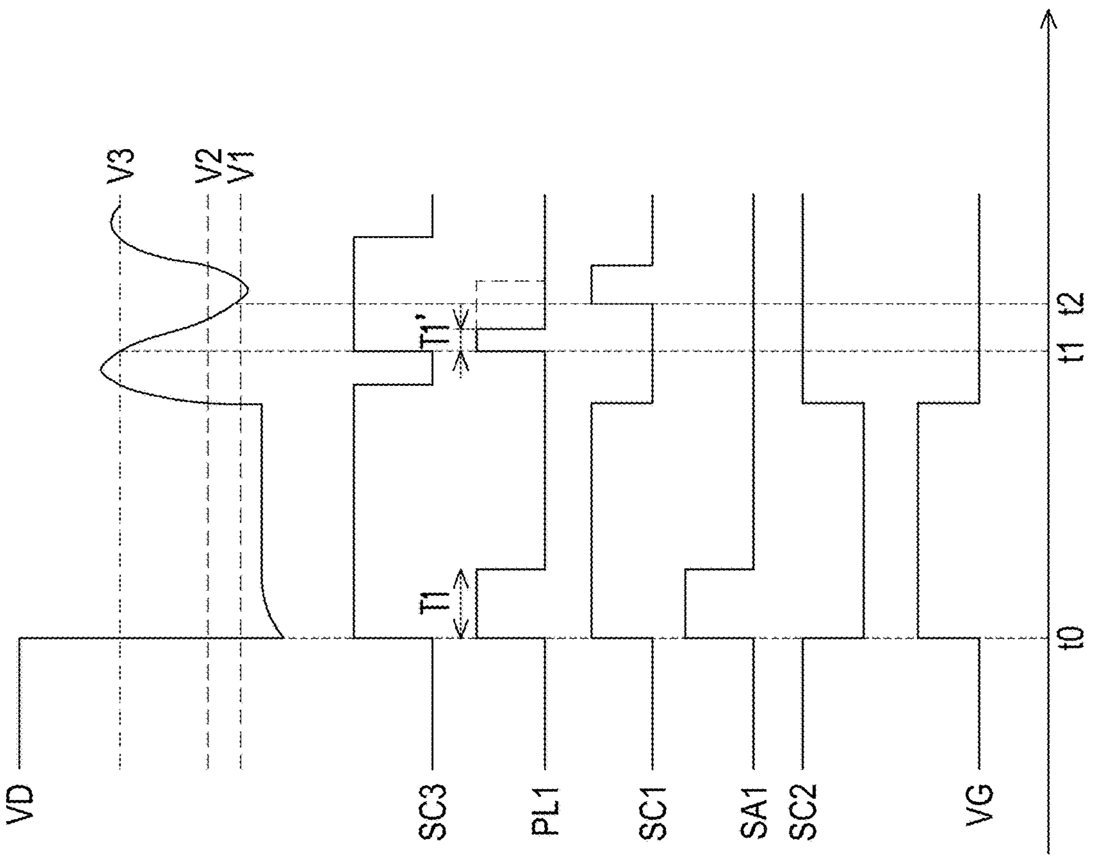

For example, in the embodiment of FIG. 3, when the drain voltage VD drops below the reference voltage V1 at time point t0, the comparison signals SC1 and SC3 output by the comparison circuits CM1 and CM3 are turned to a high voltage level, and the comparison signal SC2 output by the comparison circuit CM2 is turned to a low voltage level. The pulse signal generating circuit 106 provides the pulse signal PL1 with a pulse width Tl according to the comparison signal SC3. The logic gate circuit 108 generates the conduction control signal SA1 according to the pulse signal PL1 and the comparison signal SC1. The logic control circuit 110 outputs a synchronous rectification control signal VG of a high voltage level to turn on the synchronous rectification transistor MSR according to the conduction control signal SA1 and the comparison signal SC2.

The adjustment circuit 112 may reduce the pulse width of the pulse signal PL1 to prevent false conduction of the synchronous rectification transistor MSR from occurring when the drain voltage VD oscillates. As shown in FIG. 3, at time point t1, when the drain voltage VD is less than the preset voltage V3 and the comparison signal SC3 is switched to a high voltage level, thereby triggering the pulse signal generating circuit 106 to generate the pulse signal PL1, the adjustment circuit 112 reduces the pulse width of the pulse signal PL1 to Tl', i.e., the pulse signal PL1 is switched to a low voltage level before time point t2. In this way, even if the drain voltage VD is less than the reference voltage V1 at time point t2 and the comparison signal SC1 is switched to a high voltage level, the logic gate circuit 108 will not output the conduction control signal SA1 of the high voltage level, which may effectively prevent the problem of false conduction of the synchronous rectification transistor MSR from occurring when the drain voltage VD oscillates in the burst mode.

In summary, the control circuit of the embodiment of the invention may automatically determine whether the power conversion apparatus enters the burst mode based on the time when the drain voltage of the synchronous rectification transistor is lower than the preset voltage, and adjust the pulse width of the pulse signal generated by the pulse signal generating circuit, so as to avoid false conduction of the synchronous rectification transistor during an idle period of the burst mode.

What is claimed is:

1. A synchronous rectification circuit, suitable for driving a synchronous rectification transistor of a power conversion apparatus, the synchronous rectification circuit comprising:

a first control circuit, coupled to a drain terminal of the synchronous rectification transistor to receive a drain voltage;

a pulse signal generating circuit, coupled to the first control circuit, wherein the first control circuit determines whether the power conversion apparatus enters a burst mode according to a time when the drain voltage is lower than a preset voltage, and adjusts a pulse width of a pulse signal generated by the pulse signal generating circuit;

a first comparison circuit, coupled to the drain terminal of the synchronous rectification transistor, and comparing the drain voltage with a first reference voltage to output a first comparison signal;

a logic gate circuit, coupled to the pulse signal generating circuit and the first comparison circuit, and generating a conduction control signal according to the pulse signal and the first comparison signal; and a logic control circuit, coupled to the logic gate circuit and a control terminal of the synchronous rectification transistor, and turning on the synchronous rectification transistor according to the conduction control signal.

2. The synchronous rectification circuit as claimed in claim 1, further comprising:

a second comparison circuit, coupled to the drain terminal of the synchronous rectification transistor, and comparing the drain voltage with a second reference voltage to output a second comparison signal, wherein the logic control circuit turns off the synchronous rectification transistor according to the second comparison signal.

3. The synchronous rectification circuit as claimed in claim 1, wherein the first control circuit comprises:

a third comparison circuit, coupled to the drain terminal of the synchronous rectification transistor, and comparing the drain voltage with the preset voltage to output a third comparison signal, wherein the pulse signal generating circuit generates the pulse signal according to the third comparison signal; and an adjustment circuit, coupled to the third comparison circuit and the pulse signal generating circuit, and adjusting the pulse width of the pulse signal according to the time when the drain voltage is lower than the preset voltage.

4. The synchronous rectification circuit as claimed in claim 3, wherein the adjustment circuit determines that the power conversion apparatus enters the burst mode and adjusts the pulse width of the pulse signal in response to the time when the drain voltage is lower than the preset voltage being greater than a preset time.

5. The synchronous rectification circuit as claimed in claim 3, wherein the adjustment circuit further determines whether the power conversion apparatus enters the burst mode based on a switching frequency of the third comparison signal between a high voltage level and a low voltage level.

6. The synchronous rectification circuit as claimed in claim 1, wherein the preset voltage is greater than a second reference voltage, and the second reference voltage is greater than the first reference voltage.

7. A power conversion apparatus, comprising:

a transformer, having a primary side and a secondary side, wherein a first terminal of the primary side is configured to receive an input voltage, and a first terminal of the secondary side is configured to provide an output voltage to a load;

a synchronous rectification transistor, wherein a drain terminal of the synchronous rectification transistor is coupled to a second terminal of the secondary side, and a source terminal of the synchronous rectification transistor is coupled to a ground terminal; and a synchronous rectification control circuit, comprising:

a first control circuit, coupled to the drain terminal of the synchronous rectification transistor to receive a drain voltage;

a pulse signal generating circuit, coupled to the first control circuit, wherein the first control circuit determines whether the power conversion apparatus enters a burst mode according to a time when the drain voltage is lower than a preset voltage, and adjusts a pulse width of a pulse signal generated by the pulse signal generating circuit;

a first comparison circuit, coupled to the drain terminal of the synchronous rectification transistor, and comparing the drain voltage with a first reference voltage to output a first comparison signal;

a logic gate circuit, coupled to the pulse signal generating circuit and the first comparison circuit, and generating a conduction control signal according to the pulse signal and the first comparison signal; and a logic control circuit, coupled to the logic gate circuit and a control terminal of the synchronous rectification transistor, and turning on the synchronous rectification transistor according to the conduction control signal.

8. The power conversion apparatus as claimed in claim 7, wherein the synchronous rectification control circuit further comprises:

a second comparison circuit, coupled to the drain terminal of the synchronous rectification transistor, and comparing the drain voltage with a second reference voltage to output a second comparison signal, wherein the logic control circuit turns off the synchronous rectification transistor according to the second comparison signal.

9. The power conversion apparatus as claimed in claim 7, wherein the first control circuit comprises:

a third comparison circuit, coupled to the drain terminal of the synchronous rectification transistor, and comparing the drain voltage with the preset voltage to output a third comparison signal, wherein the pulse signal generating circuit generates the pulse signal according to the third comparison signal; and an adjustment circuit, coupled to the third comparison circuit and the pulse signal generating circuit, and adjusting the pulse width of the pulse signal according to the time when the drain voltage is lower than the preset voltage.

10. The power conversion apparatus as claimed in claim 9, wherein the adjustment circuit determines that the power conversion apparatus enters the burst mode and adjusts the pulse width of the pulse signal in response to the time when the drain voltage is lower than the preset voltage being greater than a preset time.

11. The power conversion apparatus as claimed in claim 9, wherein the adjustment circuit further determines whether the power conversion apparatus enters the burst mode based on a switching frequency of the third comparison signal between a high voltage level and a low voltage level.

12. The power conversion apparatus as claimed in claim 7, wherein the preset voltage is greater than a second reference voltage, and the second reference voltage is greater than the first reference voltage.

* * * * *